Figure 1:
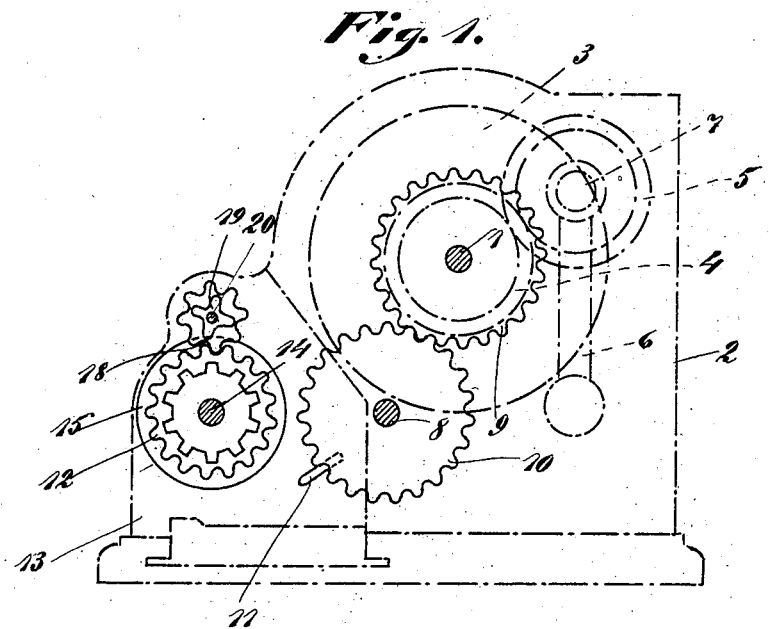

V. J. ODHNER.
CALCULATING MACHINE.
APPLICATION FILED JULY 9, 1919.

1,377,270.

Patented May 10, 1921.

Inventor
V. J. Odhner,
By H. R. Kerslake
Attorney

UNITED STATES PATENT OFFICE.

VALENTIN JAKOB ODHNER, OF GOTTENBORG, SWEDEN.

CALCULATING-MACHINE.

1,377,270.   Specification of Letters Patent.   Patented May 10, 1921.

Application filed July 9, 1919. Serial No. 309,788.

*To all whom it may concern:*

Be it known that I, VALENTIN JAKOB ODHNER, a subject of the King of Sweden, and resident of Vasaplatsen 1, Gottenborg, in the Kingdom of Sweden, have invented certain new and useful Improvements in Calculating-Machines, of which the following is a specification, reference being had therein to the accompanying drawing.

In calculating machines of the type described in Patent No. 514,725, dated February 13, 1894, and provided with calculating wheels, which, when rotated, by means of teeth, brought into operative position, shift registering wheels together with indicating disks, also indicating disks are provided, which are shifted during the rotation of the calculating wheels and are adapted to indicate the number of revolutions of the calculating wheels. Each of the indicating disks last mentioned generally is provided on one half of its periphery with white figures from 0 to 9 inclusive and on the other half of its periphery with red figures from 1 to 8 inclusive for indicating the number of revolutions of the calculating wheels in one or the other directions, the order of the red figures being opposite to that of the white figures. The said arrangement of the indicating disks in question results in the impossibility of the indicating disks of indicating a higher number of revolutions of the calculating wheels than nine. However, it sometimes is necessary to rotate the calculating wheels a number of revolutions, which is greater than nine, at the same position of the so called carriage. For instance if one desires, when adding to indicate the number of items listed this may be effected by counting their number, which number will correspond with the number of revolutions of the calculating wheels. If now, for instance, the number of items is twelve, the calculating machine does not indicate the said number but the unit disk shows the red figure 7. As a further example of the impropriety of the said arrangement of the indicating disks may be stated that in multiplicating a number by 99 one usually multiplies the number by 100 by shifting the carriage to the tens column and rotating the calculating wheels one revolution and then subtracts the number once from the product by rotating the calculating wheels in opposite direction, after the carriage has been shifted to the units column. This results in the indicating disks showing the number 101 and not 99, for which reason it is impossible to ascertain, if the multiplication has been effected by the proper number. Further examples of the impropriety of the arrangement of the indicating disks hitherto used could be stated. The object of this invention is to remove the said disadvantage and to arrange the indicating disks in such manner, that they exactly indicate the number of revolutions of the calculating wheels, however great it may be within ordinary limits.

Figure 2:
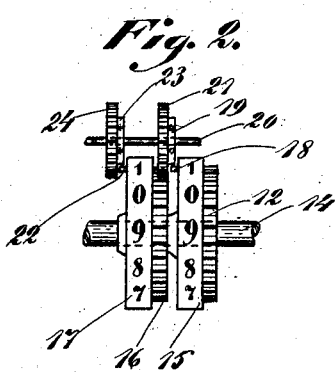

In the accompanying drawing Figure 1 is an end view of so much of a calculating machine as is necessary for illustrating the invention. Fig. 2 shows two indicating disks together with the transmitting wheels, viewed from the front side of the machine.

1 is the shaft, journaled in the frame 2 of the machine and carrying the calculating wheels 3. The said shaft 1 is rotated in the ordinary manner by a gearing 4, 5 and by means of a shaft 7 provided with a handle 6. The shaft 1 rotates by means of a gearing 9, 10 a shaft 8. The toothed wheels 9, 10 have the same diameter. The wheel 10 has an arm 11. As the calculating wheels are rotated one revolution by means of the handle 6, also the wheel 10 is rotated one revolution and rotates by means of the arm 11 a toothed wheel 12, which is rotatably mounted on a shaft 14, provided in the ordinary carriage 13. In this manner an indicating disk 15, which is connected with the wheel 12 or made integral with the same, is rotated one step, so that a new figure is visible in the ordinary opening provided in the casing of the carriage. The machine is provided with a plurality of toothed wheels with indicating disks, representing units, tens, hundreds, etc., and provided with only one set of figures from 0 to 9 inclusively. Thus in Fig. 2 a toothed wheel 16 with an indicating disk 17 is shown, representing tens. The indicating disk 15 has a lateral pin or projection 18, which as the disk is rotated from 0 to 9 or from 9 to 0 engages a toothed wheel 19, which is rotatably mounted on a shaft 20, provided in the carriage and parallel with the shaft 14. A toothed wheel 21 is connected with the said wheel 19 or made integral with the same and meshes with the toothed wheel 16 of the next indicating disk 17 of higher order. The said pin 18 rotates the toothed wheel 19 one step, during which movement the toothed wheel 19 by means of the gearing 21, 16 rotates the indicating disk 17 one step or from 0 to 1 for instance. The indicating disk 17 has a similar lateral pin 22, which coöperates with a toothed wheel 23 provided on the shaft 20 and connected with a toothed wheel 24, meshing with the toothed wheel of the next indicating disk and so on.

By this arrangement the toothed wheel 19 of the shaft 20 may be rotated free from the toothed wheel 12 and the disk 15 when the said disk is in its zero position. For this purpose the disk 15 is provided with a lateral pin 18, which in the zero position of the disk, is located so far on the side of a line passing through the centers of the shafts 14 and 20, that the teeth of the wheel 19 can not coöperate with the pin 18 if the wheel 19 is rotated, but the pin 18 engages the teeth of the wheel 19 as soon as the disk 15 is rotated.

Thus, one perceives, that, if the carriage is so adjusted, that the arm 11 actuates the toothed wheel 12 of the units disk 15 and the calculating wheels are rotated more than nine revolutions, for instance sixteen revolutions, the indicating disks 17 and 15 are so shifted that they show 1 and 6 respectively and exactly indicate the number of revolutions, through which the calculating wheels have been rotated.

The indicating disks 15, 17, etc., and the toothed wheels 12, 16, etc., belonging to the same are so arranged, that the toothed wheel 16, etc., is located opposite to the arm 11, as the carriage is moved for one or more steps respectively toward the right, so that the disk 17 representing tens, etc., is shifted directly by the arm 11, which ought to be the case when multiplication with tens (hundreds, etc.) is to be effected. The arm 11 then shifts the indicating disk 17 one step or for one figure during each revolution of the calculating wheels, so that the indicating disk 17 and the indicating disks located at the left hand side of the same are shifted and these disks indicate the number of revolutions made by the calculating wheels. In this case no movement may be transmitted from the toothed wheel 16 to the indicating disk 15. For that reason the diameter of the toothed wheel 19 is so adapted, that, even if the indicating disk 15 is in zero, which normally is the case and as shown in Fig. 1, the toothed wheel 19 may be rotated without actuating the pin 18. Thus, one perceives, that owing to the said arrangement no movement is transmitted from indicating disks of a higher value to indicating disks of a lower value, while the former disks are reset to zero.

If, by means of the described calculating machine, a number should be multiplied with 99 in the manner stated above, i. e., the number is at first multiplied with 100, the amount being then subtracted one time, one finds, that during the said multiplication, which is effected, while the carriage is so adjusted, that the arm 11 actuates the disk indicating hundreds, the said disk is rotated one step, so that the indicating disks show 100. If then the carriage is so adjusted, that the arm 11 actuates the disk 15, indicating units, and the calculating wheels are rotated one revolution in the direction necessary for effecting the subtraction, the said arm rotates the indicating disk 15 one step backward, so that it shows the figure 9. The indicating disk 15 rotates, in its turn, the disk 17 one step backward, so that it shows the figure 9. The disk 17 effects a backward rotation of the disk indicating hundreds, so that the latter is reset to zero. Consequently, the indicating disks show the number 99, which proves that the multiplication with this number has been effected.

In order that the indicating disks also during division and subtraction, during which operations the calculating wheels are rotated in a direction opposite to that in which they are rotated during multiplication and addition, may be rotated in an unchanged direction, the machine is provided with a suitable or known arrangement between the shafts 1 and 8 for reversing the movement.

Having now particularly described my invention what I claim as new and desire to secure by Letters Patent is:

In calculating machines, the combination with calculating wheels, of rotatable indicating disks provided with gears, means transmitting motion from the calculating wheels to the said indicating disks, a shaft carrying loosely mounted gears which mesh with the gears of said disks, a toothed wheel fixed to each of the shaft gears, and a projection on each of said disks designed to engage and operate one of said toothed wheels, said toothed wheels and projections being so constructed and arranged relatively to each other that a projection may operate a toothed wheel when the disk carrying the projection is rotated in either direction, but that the last named toothed wheel, in rotation, cannot disturb the last named projection when the disk carrying the latter projection is in zero position and the projection is arranged at one side of a line drawn through the axis of a shaft and the axis of the last named disk.

In witness whereof I have hereunto signed my name.

VALENTIN JAKOB ODHNER.